United States Patent
Tawil et al.

(10) Patent No.: US 6,877,042 B2
(45) Date of Patent: Apr. 5, 2005

(54) SYSTEM AND METHOD FOR GENERATING WORLD WIDE NAMES

(75) Inventors: Ahmad H. Tawil, Round Rock, TX (US); Jacob Cherian, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 811 days.

(21) Appl. No.: 09/753,586

(22) Filed: Jan. 2, 2001

(65) Prior Publication Data

US 2002/0087727 A1 Jul. 4, 2002

(51) Int. Cl.$^7$ ............................................. G06F 15/16
(52) U.S. Cl. ........................ 709/250; 709/203; 709/220; 709/222; 709/223; 709/227; 709/228
(58) Field of Search .................................. 709/203, 220, 709/223, 227, 228, 222, 250

(56) References Cited

U.S. PATENT DOCUMENTS

| | | | |
|---|---|---|---|
| 5,208,811 A | * 5/1993 | Kashio et al. | ............... 370/401 |
| 5,636,342 A | 6/1997 | Jeffries | .................. 395/185.01 |
| 5,757,924 A | 5/1998 | Friedman et al. | ............. 380/49 |
| 5,809,328 A | 9/1998 | Nogales et al. | ............. 395/825 |
| 5,894,481 A | 4/1999 | Book | ......................... 370/412 |
| 6,006,272 A | 12/1999 | Aravamudan et al. | ....... 709/245 |
| 6,009,479 A | 12/1999 | Jeffries | ........................... 710/8 |
| 6,052,727 A | 4/2000 | Kamalanathan | ............. 709/224 |
| 6,625,747 B1 | * 9/2003 | Tawil et al. | .................... 714/6 |
| 6,631,442 B1 | * 10/2003 | Blumenau | .................... 711/112 |
| 6,684,209 B1 | * 1/2004 | Ito et al. | ......................... 707/9 |
| 6,697,875 B1 | * 2/2004 | Wilson | ....................... 709/245 |

FOREIGN PATENT DOCUMENTS

JP        10240670 A2    9/1998    ........... G06F/13/14
JP        11120092 A2    4/1999    ........... G06F/13/14

OTHER PUBLICATIONS

U.S. Appl. No. 09/152,800, entitled "Automatic Location Determination of Devices Under Test"; by Rajan, et al., assigned to Dell USA L.P (DC–01459), filed Sep. 10, 1998.
U.S. Appl. No. 09/426,932, entitled "Dynamic Virtual Local Area Network Connection Process" by Wiedeman, et al. assigned to Dell USA L.P. (DC–01966), filed Oct. 22, 1999.
U.S. Appl. No. 09/426,232, entitled "Site–to–Site Dynamic Virtual Local Area Network" by Wiedeman, et al., assigned to Dell USA L.P. (DC–01970), filed Oct. 22, 1999.
U.S. Appl. No. 09/434,770, entitled "Computer Information Access Based on a Transmitted Identificaiton Signal" by Merkin, assigned to Dell USA L.P. (DC–02032), filed Nov. 4, 1999.
U.S. Appl. No. 09/631,538, entitled "Internally Connected Network Interface Cards for Clustered Processing", by Hass et al., assigned to Dell Products L.P. (DC–02348), filed Aug. 3, 2000.
U.S. Appl. No. 09/330,725, entitled "Method and System for Establishing a Storage Area Network Configuration", by Tawil, assigned to Dell USA L.P. (DC–0305), filed Nov. 16, 1999.

(Continued)

*Primary Examiner*—Mohammad O. Farooq
(74) *Attorney, Agent, or Firm*—Baker Botts L.L.P.

(57) ABSTRACT

In the present disclosure, a method and system is provided for generating worldwide names. The method and system includes reading a media access control (MAC) address associated with a network interface card (NIC). A fiber channel device associated with the NIC is then identified. A world wide name for the identified fiber channel device is then generated by appending a vendor specific identifier assigned to the fiber channel device to the MAC address obtained from the NIC.

16 Claims, 2 Drawing Sheets

OTHER PUBLICATIONS

Snively, Bob, "X3T11 Technical Committee—New Identifer Formats Based on IEEE Registration"; at internet <http://standards.ieee.org/regauth/oui/tutorials fibreformat.html>, printed Mar. 3, 2000.

Snively, Bob, "Use of the IEEE Registration Authority Assigned 'company_id' with the ANSI X3.320 FC–PH Fibre Channel Specification and its Extensions", Feb 24, 1997 at internet <http://standards.ieee.org/regauth/oui/tutorials/fibrecomp)id.html>, printed Mar. 3, 2000.

Dell, Vectors White Paper, "Storage Area Network (SAN) Technology" Feb. 1999 at internet <http://www.euro.dell.com/ . . . cs/vectors_1999–sansol.htm>, printed Dec. 6,2000.

Dell, Vectors White Paper, "Storage Area Network (SAN) Technology" Aug. 1998 at internet <http://www.euro.dell.com/ . . . cs/vectors_1998–wpsan.htm>, printed Dec. 7, 2000.

Murali Rajagopa, et al., "IP and ARP over Fibre Channel" Kashpureff Boling Laboratories, Inc. at internet <http://www.kblabs.com/lab . . . fibre–channel–00.txt.html>, printed Dec. 6, 2000.

Drawings filed in U.S. Appl. No. 09/152,800, entitled "Automatic Location Determination of Devices Under Test"; by Rajan, et al., assigned to Dell USA L.P (DC–01459), filed Sep. 10, 1998.

Drawings filed in U.S. Appl. No. 09/426,932, entitled "Dynamic Virtual Local Area Network Connection Process" by Wiedeman, et al. assigned to Dell USA L.P. (DC–01966), filed Oct. 22, 1999.

Drawings filed in U.S. Appl. No. 09/426,232, entitled "Site–to–Site Dynamic Virtual Local Area Network" by Wiedeman, et al., assigned to Dell USA L.P. (DC–01970), filed Oct. 22, 1999.

Drawings filed in U.S. Appl. No. 09/434,770, entitled "Computer Information Access Based on a Transmitted Identificaiton Signal" by Merkin, assigned to Dell USA L.P. (DC–02032), filed Nov. 4, 1999.

Drawings filed in U.S. Appl. No. 09/631,538, entitled "Internally Connected Network Interface Cards for Clustered Processing", by Hass et al., assigned to Dell Products L.P. (DC–02348), filed Aug. 3, 2000.

Drawings filed in U.S. Appl. No. 09/330,725, entitled "Method and System for Establishing a Storage Area Network Configuration", by Tawil, assigned to Dell USA L.P. (DC–01814), filed Nov. 16, 1999.

* cited by examiner

SYSTEM AND METHOD FOR GENERATING WORLD WIDE NAMES

TECHNICAL FIELD

This invention relates in general to the field of network addressing, and more particularly to a system and method for generating world wide names.

BACKGROUND

Demand for data storage capacity has increased substantially as the use of data intensive applications has grown more common. Internet use and data-intensive applications such as multimedia and online transaction processes have contributed to the increased demand for data storage capacity. Users are also demanding faster access to the data and the ability to share pooled data among a large number of users over distributed locations. To meet demands for increased storage capacity and more rapid access to data, the computer industry is turning to storage area networks (SANs), collections of data storage devices interfaced with one or more servers or workstations. Many SANs make use of Fibre Channel (FC) technology for transmitting data at higher rates. FC devices are often based on Fibre Channel Protocol (FCP) which may also be referred to as the Fibre Channel standard. FCP supports a number of protocols including SCSI, Asynchronous Transfer Mode, Transmission Control Protocol/Internet Protocol (TCP/IP), High Performance Parallel Interface (HiPPI), Intelligent Peripheral Interface (IPI) and others.

FCP requires that each node and its associated ports in a Fibre Channel network have unique addresses known as Worldwide Names. Each Worldwide Name contains eight bytes (64 bits). Three bytes (twenty-four bits) are used to identify the manufacturer of the device and are assigned to registered members by the Institute of Electrical and Electronics Engineers (IEEE). Another three bytes define the vendor specified field and are used by each vendor to create a unique identifier for the devices. The remaining two bytes may also be used by the manufacturer to extend the vendor specified field.

Although each Worldwide Name contains eight bytes of information, manufacturers may only the vendor specified field to define unique addresses for their devices. Once the manufacturer exhausts all of the possible combinations in the vendor specified field, the manufacturer must be assigned a new company identification number by the IEEE. Manufacturers are required to manage their assignment of identification numbers to insure that duplicate addresses are not assigned. Because FCP allows for a longer address field, existing systems used to manage the assignment of identifiers for MAC addresses will not allow for the management of assigned identifiers for FCP devices. Consequently, managing the identifiers of FC devices typically requires establishing an additional system to keep track of the assignment of identifiers for those devices.

Another difficulty associated with the assignment of WWNs is that if a manufacturer switches from assigning MAC addresses to WWNs, the manufacturing process requires modification to incorporate the WWN since the worldwide name is typically stored in non-volatile memory such that the WWN is saved when a system is turned off or power is lost.

Another difficulty with assigning WWNs to fibre channel devices is the need to include additional non-volatile random access memory (NVRAM) on either the device itself or the motherboard of a server that the device couples to. Because NVPAM is typically expensive, the need for additional NVRAM for storage WWNs increases the overall cost of the system.

SUMMARY

Therefore, a need has arisen for method of assigning world wide names that minimizes the need for NVRAM.

A further need has arisen for a system and method of assigning WWNs that facilitates the management of identifiers to insure that duplicate identifiers are not assigned for generating worldwide names for fibre channel devices.

In accordance with the present disclosure, a method and system is provided that substantially eliminates or reduces disadvantages and problems associated with previously used methods for generating worldwide names. The method and system includes reading a media access control (MAC) address associated with a network interface card (NIC). The method and system then generates a worldwide name for a fibre channel device by appending a vendor specific identifier assigned to the fibre channel device to the MAC address obtained from the network interface card.

More specifically, an application module associated with a server operable to interface with a fibre channel network reads a MAC address of the NIC associated with the server. After reading the MAC address, the application module identifies target devices interfaced with the server. The application module then generates a unique vendor specified identifier to each of the identified target devices. The application module generates a worldwide name for each target device by appending the unique vendor specified identifier generated for each respective target to the MAC address read from the NIC.

In one embodiment, the MAC address for the NIC includes a company identification field and a first vendor field that has a first vendor specified identifier. The worldwide name for each of the identified target devices includes the MAC address, a second vendor field that has a second vendor specified identifier and a network address authority (NAA) field. The application module assigns the second vendor specified identifier to each of the target devices to generate the unique worldwide name for each target device.

The present disclosure provides a number of important technical advantages. One such advantage is providing an applications module to generate WWN's for identified target devices. The use of the application module eliminates the need to store the WWNs of the identified devices in NVRAM.

Another technical advantage of the present disclosure is appending an existing MAC address of the NIC to generate a WWN. This reduces the need for manufacturers to maintain and manage vender specified identifiers for FC devices separately from MAC addresses.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

Figure 1:
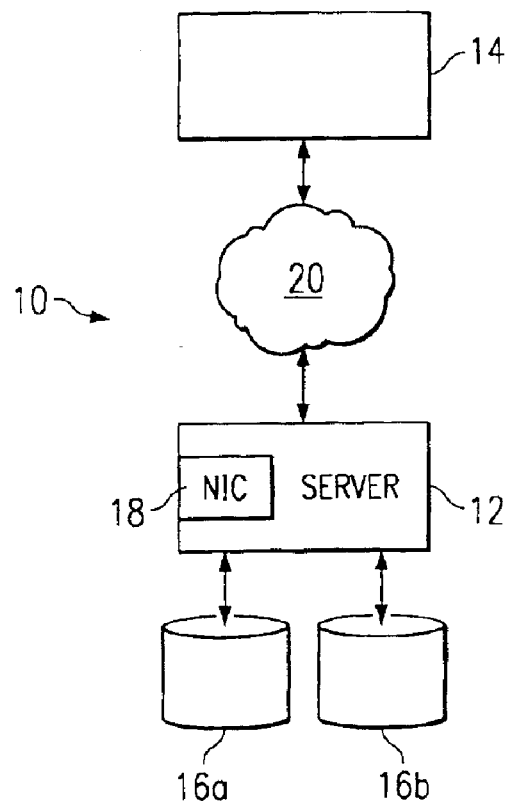
FIG. 1 illustrates a block diagram of a storage area network.

FIG. 1 illustrates a block diagram of a computer system 10 for generating worldwide names for associated component or targets 16. Network 18 interfaces with server 12 and initiator 14. In one embodiment, network 18 is a storage area network (SAN) that includes conventional networking components compatible with fibre channel protocol (FCP) and small computer system interface (SCSI) standards. The present disclosure is further applicable to networks compatible with additional protocols and standards. Typical SAN components are fibre channel based and may include host bus adapters, switches, bridges, disk arrays such as redundant arrays of independent disks (RAIDs) and other suitable components.

A SAN may be defined when physical storage device sharing is enabled, such as through fibre channel loops and hubs or switches. Each device interfaced with a fibre channel network may be referred to as a node. Nodes that generate and seek to store data, such as workstations or servers, may be known as initiators or originators. Nodes that act as data storage devices, such as disk storage, tape drives, or RAID devices, may be known as targets or responders. Alternatively, devices within a network may also be referred to as originators, and devices that generate and seek to store data may be referred to as responders, especially within non-SCSI networks.

A SAN may use different types of topologies, including point-to-point, switched fabric, arbitrated loop and combinations of these topologies. In the point-to-point topology, nodes are connected by direct connections through a node port located in each of the devices. In the switched fabric topology, one or more electronic switching devices may be included that provide multiple, simultaneous, point-to-point connections between node pairs. In the arbitrated loop topology, devices may connect to the network via a loop port. A hub may be added to connect multiple nodes to one loop and allow devices to be added or removed from the loop with minimal disruption to the network.

FC technology allows data and network protocols to coexist on the same physical media. In one embodiment, the physical media may be a twisted pair copper cable used for the public switched telephone network (PSTN). In other embodiments, the physical media may be fiber-optic cable if the distance between nodes is too large for copper cable. A typical command set protocol is FCP-SCSI compatible for interfacing initiators, such as servers and work stations, with targets, such as conventional storage devices and RAIDS. FCP-SCSI commands allow storage and retrieval of data to and from the initiator and the target storage device as though the storage area network is simply an SCSI device interfaced through fibre channel fabric.

Server 12 interfaces with plural targets 16 and network 18. Targets 16 may be data storage devices, such as disk storage, tape drives, RAID devices, or other suitable devices. Targets 16 may couple to server 12 through a port, such as an initiator port, and may provide virtual storage for network 18. Although targets 16 are shown as being directly coupled to server 12, alternatively, targets 16 may be coupled to network 18 and indirectly coupled to server 12. Additionally, targets 16 have been shown to be coupled to server 12 via a single connection. However, the present disclosure contemplates the use of redundant connection between all components within system 10.

In operation, server 12 reads the media access control (MAC) address associated with network interface card (NIC) 18 and identifies targets 16. Server 12 then assigns each of targets 16 a unique vendor specified identifier and appends the vendor specified identifier on to the MAC address to generate a unique worldwide name for each of targets 16. Each identified target 16 is then assigned a unique WWN corresponding to its unique vendor specified identifier.

Figure 2:
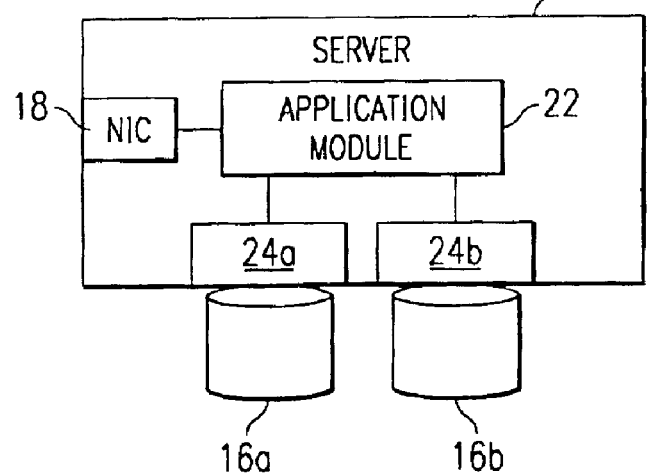
FIG. 2 illustrates a block diagram of a server including an application module for generating worldwide names.

FIG. 2 illustrates a block diagram of server 12. Server 12 includes NIC 18, application module 22 and initiator ports 24. NIC 18 couples server 12 to network 20 as shown in FIG. 1. NIC may also couple server 12 to other networks, such as Internet Protocol (IP) networks, Asynchronous Transfer Mode (ATM) networks, Frame Relay networks and other networks operable to communicate data.

Figure 3A:
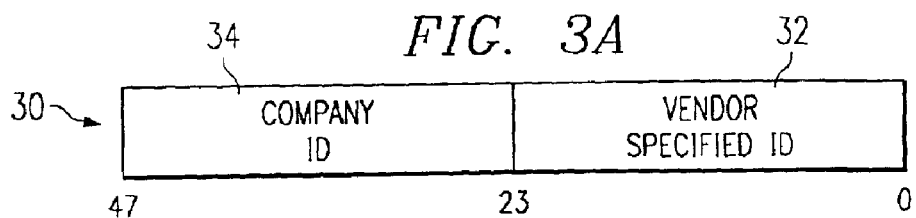
FIG. 3A illustrates a block diagram of a MAC address.

NIC 18 includes a MAC address as shown in FIG. 3A. Application module 22 couple to NIC 18 such that application module 22 can read the MAC address of NIC 18. Application module 22 is further coupled to initiator ports 24A and 24B. Initiator ports 24A and 24B are coupled to targets 16A and 16B, respectively. In the present embodiment, initiator ports 24A and 24B are directly coupled to target 16A and 16B. In an alternative embodiment targets 16A and 16B may be located remotely from initiator ports 24A and 24B. Application module 22 is preferably operable to identify targets 16 and initiator ports 24. In the present embodiment, initiator ports 24A and 24B and target 16A and 16B are provided. In an alternative embodiments a plurality of initiator ports 24 and targets 16 may be provided. The system may also facilitate the use of a selectable configurable number of initiator ports 24 and targets 16 such that server 12 may have a selectable number of targets 16 based upon the functions and applications run on server 12.

Application module 22 may be a software component stored within server 12. Alternatively, application module 22 may be a hardware component within server 12.

FIG. 3A illustrates a block diagram of a MAC address. MAC address 30 includes company ID 34 and vendor specified ID 32. MAC address 30 contains 48 bits or 6 bytes of information. Bits 0–23 contain vendor specified ID; bits 24–47 contain company ID 34. Company ID 34 is preferably a company ID assigned to a particular manufacturer by the IEEE. Vendor specified ID 32 contains an identification code assigned by manufacturers. Each NIC 18 as shown in FIGS. 1 and 2 contains a MAC address 30.

Figure 3B:
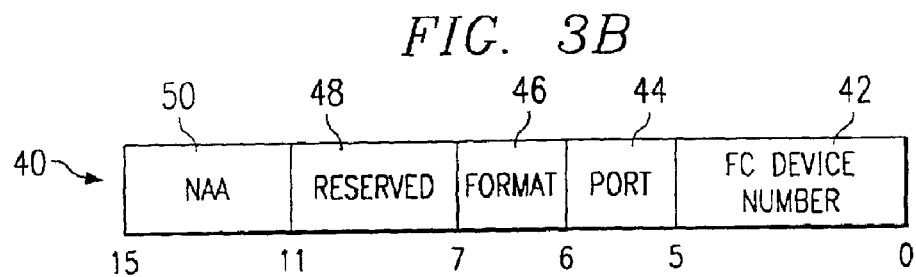
FIG. 3B illustrates a block diagram of a vendor specified identifier.

FIG. 3B illustrates a block diagram of a vendor specified identifier 40. Vendor specified identifier 40 includes fibre channel device number field 42, a port field 44, a format field 46, the reserved field 48 and naming address authority (NAA) 50. Vendor specified identifier 40 contains two bytes or 16 bits of information. Bits 0–5 contain the fibre channel device number 42; bit 6 contains port ID 44. Bit 7 contains format 46; bits 8–11 are reserved; and bits 12–16 contain ID name address authority field 50.

Figure 3C:
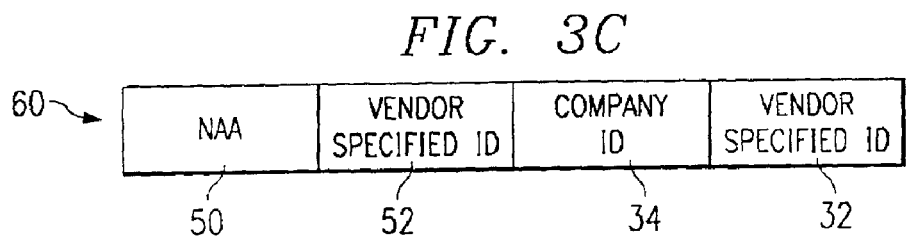
FIG. 3C illustrates a block diagram of a worldwide name.

FIG. 3C illustrates a block diagram of worldwide name 60. Worldwide name 60 contains 64 bits of information. Bits 0–23 contain vendor specified ID 32. Bits 24–47 contain company ID 34. Bits 48–59 contain vendor specified ID 52 as generated by application module 22 as shown in FIG. 2 and bits 60–63 contain naming address authority field 50.

In operation, application module 22 reads MAC address 30 from NIC 18, including company ID 34 and vendor specified ID 32. Application module then generates the vendor specified information 40 as shown in 3B for a particular target 16. Application module 22 then appends MAC address 30 to include vendor specified identification 40 to MAC address 30 to generate worldwide name 60.

Figure 4:
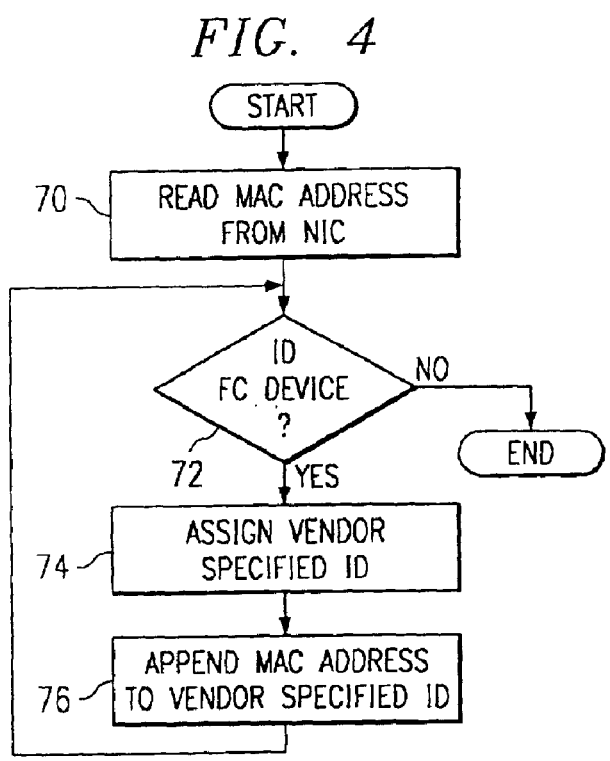
FIG. 4 illustrates a flow diagram for generating worldwide names.

FIG. 4 illustrates a flow diagram for generating worldwide names according to the present disclosure. In step 70, a MAC address is read from a NIC. In the second step an application module detects a fibre channel device or target associated with the NIC. If a fibre channel device is not found to be associated with the NIC, the process ends. If a fiber channel device is found to be associated with the NIC, then a vendor specified identification is generated for that fibre channel device in step 74. In the next step 76, the MAC address of the NIC is appended with the vendor specified ID generated in step 74. The application module then returns to step 72 to identify any additional fibre channel device.

Although the disclosed embodiments have been described in detail, it should be understood that various changes, substitutions and alterations can be made to the embodiments without departing from their spirit and scope.

What is claimed is:

1. A computer system comprising:
   a server operable to interface with a network, the server comprising a component that is assigned a media access control (MAC) address;
   a target operable to interface with the server, the target comprising a worldwide name incorporating the MAC address;
   an application module associated with the server, the application module operable to:
   read the MAC address from the component;
   assign a vendor specified identifier to the target; and
   generate the worldwide name by appending the vendor specified identifier to the MAC address.

2. The computer system of claim 1, wherein:
   the MAC address comprises a forty-eight bit MAC address; and
   the world wide name comprises a sixty-four bit world wide name incorporating the forty-eight bit MAC address.

3. The computer system of claim 1, wherein the target comprises a disk drive.

4. The computer system of claim 1, wherein the target comprises a tape drive.

5. The computer system of claim 1, further comprising an application module associated with the server, the application module operable to generate the worldwide name.

6. The computer system of claim 1, wherein the MAC address comprises:
   a company identification field; and
   a first vendor field.

7. The computer system of claim 1, further comprising a plurality of targets operable to interface with the network, each target comprising a unique worldwide name incorporating the MAC address.

8. A computer system comprising:
   a server operable to interface with a network, the server comprising a component that is assigned a media access control (MAC) address;
   a target operable to interface with the server, the target comprising a worldwide name incorporating the MAC address,
   the MAC address comprising:
   a company identification field; and
   a first vendor field;
   the worldwide name comprising:
   a second vendor field; and
   a network address authority field.

9. A computer system comprising:
   a server operable to interface with a fibre channel network, the server comprising a network interface card (NIC) having a media access control (MAC) address;
   a storage device interfaced with the server; and
   an application module associated with the server application module operable to generate a worldwide name for the storage device, the worldwide name incorporating the MAC address;
   the worldwide name further comprising:
   the MAC address comprising a company identification field and a first vendor field comprising a first vendor specified identifier;
   a second vendor field comprising a second vendor specified identifier; and
   a network address authority field.

10. The computer system of claim 9, further comprising the application module operable to:
    read the MAC address of the MC;
    assign the second vendor specified identifier to the storage device; and
    generate the worldwide name for the storage device by appending the vendor specified identifier to the MAC address.

11. The computer system of claim 9, further comprising a plurality of storage devices interfaced with the fibre channel network.

12. The computer system of claim 11, further comprising the application module operable to generate a unique worldwide name for each of the plurality of storage devices by incorporating the MAC address with a selected unique identifiers.

13. A method for generating worldwide names comprising:
    reading a forty-eight bit media access control (MAC) address for a network interface card (NIC) associated with a server operable to interface with a network;
    identifying a target interfaced with the server;
    assigning a sixteen bit vendor specified identifier to the target; and
    appending the vendor specified identifier to the MAC address to create a worldwide name for the target such that the worldwide name comprises a sixty-four bit world wide name incorporating the sixteen bit vendor specified identifier and the forty-eight bit MAC address.

14. The method of claim 13, wherein the network comprises a fibre channel network.

15. The method of claim 13, wherein identifying the target comprises identifying a storage device.

16. The method of claim 15, further comprising:
    identifying a plurality of targets interfaced with the network;
    assigning a unique vendor specified identifier to each of the plurality of targets; and
    appending each unique vendor specified identifier to the MAC address to create the worldwide name for each of the plurality of targets.

* * * * *